June 19, 1956  J. KAYUHA, JR  2,751,458

HYDRAULIC BRAKE SYSTEM OPERATED FLASHING SIGNAL

Filed Jan. 2, 1953

INVENTOR
JOSEPH KAYUHA, JR.

BY W. J. Keefer

ATTORNEY

2,751,458

HYDRAULIC BRAKE SYSTEM OPERATED FLASHING SIGNAL

Joseph Kayuha, Jr., Wheeling, W. Va.

Application January 2, 1953, Serial No. 329,399

2 Claims. (Cl. 200—83)

The present invention relates to signals carried by vehicles for indicating when the vehicle brakes are being applied and is more particularly concerned with a switch mechanism for signaling in a flashing manner through lights mounted upon the vehicle when the brake is being applied and the relative amount of such braking for warning purposes.

The principal object of the present invention is to provide a device which can be readily installed upon a vehicle and connected to the hydraulic brake system of the vehicle for being operated thereby and in turn controlling the flow of current to the vehicle stop lights in an intermittent and progressive manner.

A further and equally important object of the present invention is to provide a device which can be economically manufactured and maintained and further which can be readily connected to the hydraulic brake system and brake stop light system of new or existing vehicles.

Another important object of the present invention is to provide a device to be connected to a hydraulic brake system and vehicle stop lights for transmitting current to said lights when the vehicle brakes are being applied and which current is intermittently transmitted to said lights causing the same to flash in an increasingly faster manner as the pressure in the brake system increases and slower as the pressure in the brake system decreases.

Figure 1:
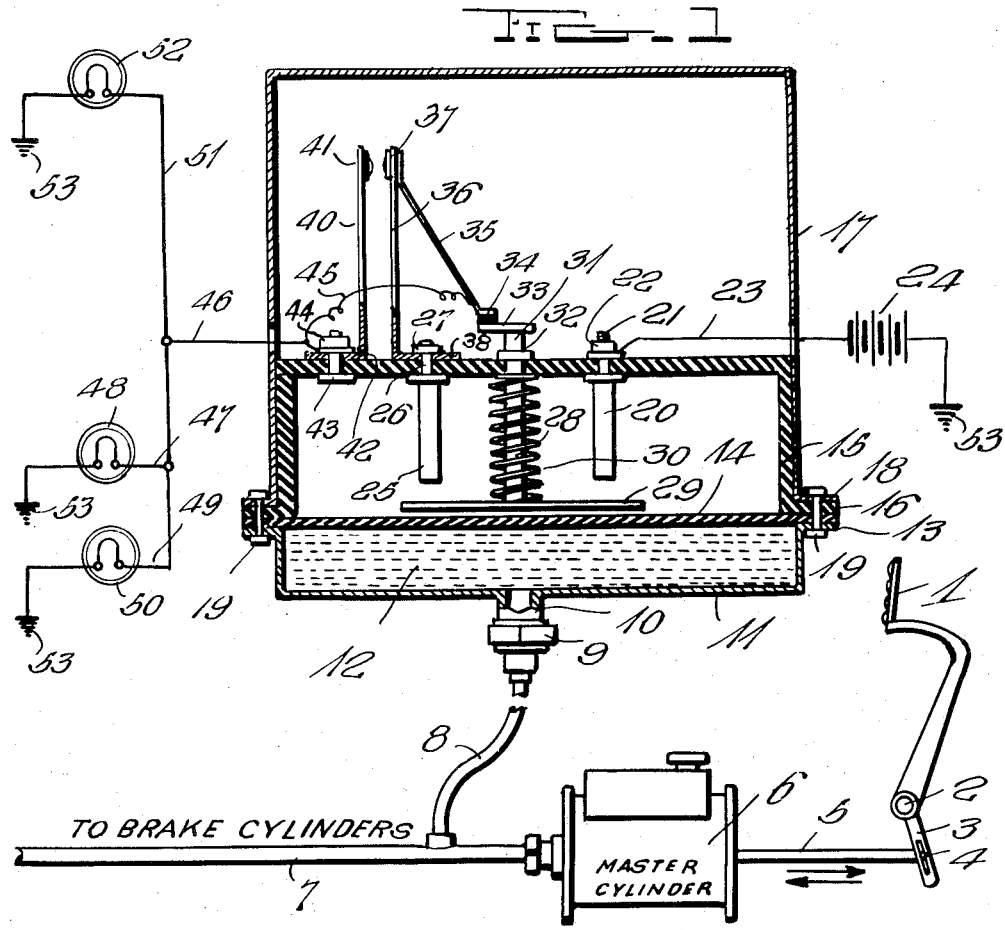

Referring now more particularly to the accompanying drawings, Fig. 1 is a plan view of a hydraulic brake system and vehicle stop lights connected to the present device which is shown in an enlarged detail cross sectional elevation.

Figure 2:
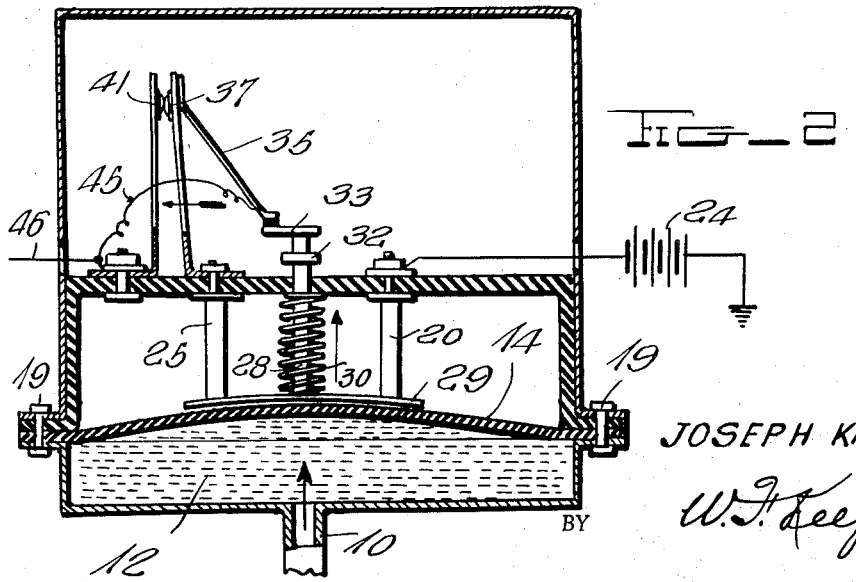

Fig. 2 is a further enlarged detail cross sectional view of the present switching mechanism when in its fully circuit closing position.

Referring now more particularly to this drawing, wherein like and corresponding parts are indicated by similar reference characters, numeral 1 refers to a brake pedal pivotally mounted, as at 2, upon a vehicle whereby link 3 through its pivotal connection to pin 4 can cause the reciprocation of rod 5 upon applying of a braking movement to pedal 1. Rod 5 operates a master cylinder 6 for causing fluid to move through tubing 7 to the vehicle brakes when applying said brakes for slowing down or stopping the vehicle. The aforementioned elements are conventional members of vehicles employing a hydraulic braking system. In the present device a tube 8 is interconnected with said tube 7 at one end thereof and at its opposite end has a coupling 9 for connecting the same to the threaded end of tube 10 by threaded engagement therewith. Said tube 10 is mounted through the bottom of a container 11 for receiving a braking fluid 12 therein and has a peripheral flange 13 upon which is positioned a resilient diaphragm 14 which extends completely across the top or open end of container 11. A support 15 of substantially U-shaped cross sectional configuration and formed of an electrical insulating material also has a peripheral flange 16 positioned around the outer edge portion of diaphragm 14. A cup shaped cover 17 encloses support 15 and has a peripheral flange 18 positioned on said support flange 16. Said flanges 13, 16 and 18 and edge portion of diaphragm 14 are connected together by a series of nuts and bolts 19 whereby said diaphragm 14 closes off container 11 in a fluid tight manner. An electrode 20 extends downwardly from the top of support 15 and has a threaded portion extending through said support with a nut 22 in threaded engagement therewith. A wire 23 connected to a battery 24 is also connected to electrode 20 and retained thereon by said nut. A second electrode 25 also extends downwardly from the top of said support and has a threaded portion 26 extending therethrough upon which is mounted a nut 27 in threaded engagement thereon.

Between said electrodes is positioned a rod 28 having a contact bar 29 extending laterally from the end thereof with a coil spring 30 positioned between said bar and said support with an end portion 31 of said rod slidably extending through said support. A projection 32 extends from said rod end 31 for limiting the downward movement of said rod relative to said support. A bar 33 extends laterally from the upper end of rod 28 and has a pad 34 of electrical insulating material mounted thereon.

A wire 35 formed from a thermo-expansive and highly electrical resistant material has one end fixedly connected to said insulating pad 34.

An L-shaped contact bar 36 having a contact point 37 mounted upon its upper end also has its base 38 positioned on support 15 and is connected to electrode 25, whose end 26 extends therethrough being retained thereon by nut 27.

A second contact bar 40 also of an L-shaped configuration has a contact point 41 carried by its opposite end facing said point 37, while its base 42 is retained on support 15 by a bolt 43 passing therethrough and its accompanying nut 44. A wire 45 connects said wire 35 with the base of contact bar 40 and is retained thereon by said nut 44.

A wire 46 connects bar 40 to the vehicle stop lights such as for example by means of a wire 47 to a light 48, wire 49 to light 50, wire 51 to light 52, with all of said lights being grounded to the vehicle, such as at 53.

When the driver of a vehicle incorporating the present device thereon moves brake pedal 1 for applying the brakes, master cylinder 6 causes fluid to flow under pressure to the various brakes for slowing down or stopping the vehicle, depending upon the amount of pressure applied to pedal 1.

Some of the fluid under pressure in tube 7 is caused to move through tubes 8 and 10 into container 11 where its further flow is restricted by diaphragm 14. However, said diaphragm, due to its resiliency, bulges upwardly under this pressure pushing bar 29 up to and forming a contact between electrodes 20 and 25. Accordingly, current flows from battery 24 through wire 23, electrode 20, bar 29, electrode 25 up through contact bar 36 to wires 35 and 45, wire 46 and from there to the lights 48, 50 and 52 to the ground 53. Thus the application of the brake is indicated by said lamps as a warning to other drivers viewing the same. However due to the high electrical resistance of wire 35, said lamps only receive a small amount of current insufficient to light said lamps. At the same time wire 35 will become heated and caused to expand, pushing point 37 towards point 41 until they contact whereupon the full flow of current will move directly from bar 36 to bar 40, brightly illuminating said lamps and permitting wire 35 to cool until it contracts, disrupting the contacting of said points. Thus wire 35 repeatedly makes and breaks points 37 and 41, causing a flashing of the signal lamps.

When a small amount of pressure is applied to brake 1, there is only a small amount of pressure in the fluid 12 and, consequently, diaphragm 14 moves upwardly a short distance, pushing wire 35 and, consequently, point 37 towards point 41. Wire 35, therefore, has to expand considerably before points 37 and 41 are in contact, thus causing a relatively slow flashing of said lamps. However if the brake is applied as for a complete stop; that is, with maximum pressure on pedal 1, diaphragm 14 will cause bar 29, which is flexible, to bend slightly and rod 28 will move wire 35 so that points 37 and 41 are but slightly spaced apart and, therefore, wire 35 needs little expansion to close these points as well as little contraction to break the contact causing a rapid flashing of said lights. Thus the amount of pressure applied to pedal 1 will proportionately vary the time of flashing of the signal lights so that other drivers can readily determine the amount of braking being applied.

It is to be appreciated that the present device can be readily applied to the brake systems of the existing vehicles or can be installed as parts of new vehicles, or can be used as a signalling device on any pressure varying mechanism whether used in connection with motor vehicles or elsewhere, and it is also capable of considerable modification, and such changes thereto as come within the scope of the appended claims are deemed to be a part of the invention.

I claim:

1. A pressure responsive electrical switch comprising a support of electrical insulating material, a pair of electrodes extending downwardly from said support, a rod slidably mounted through said support, pressure actuated means for moving said rod longitudinally in accordance with the amount of pressure received thereby, a flexible contact member of electrical current conducting material carried by said rod for contacting said electrodes upon upward movement of said rod and conducting current therebetween, a means for supplying electrical current connected to one of said electrodes, a pair of spaced contact bars mounted at one end to said support, a wire of thermo-expansive and electrical resistance material connected to the free end of one of said contact bars for making and breaking contact between said bars upon the expansion and contraction of said wire and capable of moving said bar towards the other of said bars in accordance with the upward movement of said rod for varying the space between said bars thereby varying the timing of the making and breaking of the contact therebetween, insulating material connecting said wire and said rod for movement together, an electrical connecting means connected to the other of said contact bars and means electrically connecting the insulated end of said wire to said connecting means.

2. A pressure responsive electrical switch comprising an expansible chamber, means for expanding said chamber an amount in accordance with the pressure applied thereto, a support of electrical insulating material, a rod slidably mounted through said support operatively connected to said chamber for being moved longitudinally thereby, a flexible contact member of electrical current conducting material carried by said rod, resilient means tending to hold said contact member against said chamber, a pair of electrodes mounted on said support and positioned for being contacted by said contact member upon expansion of said chamber for conducting current therebetween, means for supplying electrical current connected to one of said electrodes, a pair of spaced contact point carriers mounted on said support and having one carrier connected to the other of said electrodes, an insulating pad mounted on said rod, a thermo-expansive and electrical resistance member connecting said pad and said electrode connected point carrier and arranged for varying the space between the contact points of said carriers upon the movement of said rod and moving said electrode connected point carrier to and from the other of said point carriers upon the expansion and contraction of said resistance member for repeatedly making and breaking the circuit of the switch and an electric signalling circuit connecting means connected to said resistance member and the other of said point carriers.

References Cited in the file of this patent

UNITED STATES PATENTS

| | | |
|---|---|---|
| 1,613,305 | Batcheller | Jan. 4, 1927 |
| 1,946,759 | Preston et al. | Feb. 13, 1934 |
| 1,951,882 | Pentecost | Mar. 20, 1934 |
| 2,091,086 | Taylor | Aug. 24, 1937 |
| 2,134,902 | White | Nov. 1, 1938 |
| 2,276,028 | Dick | Mar. 10, 1942 |